(12) United States Patent
Henriet et al.

(10) Patent No.: US 12,316,427 B2
(45) Date of Patent: May 27, 2025

(54) COMMUNICATION IN A WIRELESS BATTERY MANAGEMENT SYSTEM FOR A BATTERY PACK STRUCTURE

(71) Applicant: SENSATA TECHNOLOGIES, INC., Attleboro, MA (US)

(72) Inventors: Nicolas R. Henriet, Arcon (FR); Fabien R. Kolly, Morteau (FR); Jonathan M. Rigelsford, Sheffield (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 340 days.

(21) Appl. No.: 17/799,336

(22) PCT Filed: Feb. 12, 2021

(86) PCT No.: PCT/US2021/017876
§ 371 (c)(1),
(2) Date: Aug. 12, 2022

(87) PCT Pub. No.: WO2021/163500
PCT Pub. Date: Aug. 19, 2021

(65) Prior Publication Data
US 2023/0140826 A1 May 4, 2023

Related U.S. Application Data

(60) Provisional application No. 62/976,907, filed on Feb. 14, 2020.

(51) Int. Cl.
*H01M 10/48* (2006.01)
*H01M 10/42* (2006.01)
(Continued)

(52) U.S. Cl.
CPC .......... *H04B 7/145* (2013.01); *H01M 10/425* (2013.01); *H01Q 1/3233* (2013.01);
(Continued)

(58) Field of Classification Search
CPC ................ H04B 7/145; H01M 10/425; H01M 2010/4271; H01M 2010/4278;
(Continued)

(56) References Cited

U.S. PATENT DOCUMENTS

| | | |
|---|---|---|
| 7,429,953 B2 | 9/2008 | Buris et al. |
| 2008/0094222 A1 | 4/2008 | Kaoru |

(Continued)

FOREIGN PATENT DOCUMENTS

| | | |
|---|---|---|
| CN | 201549594 U | 8/2010 |
| DE | 102021104005 A1 | 9/2021 |

(Continued)

OTHER PUBLICATIONS

International Search Report and Written Opinion, PCT/US2021/017876, May 12, 2021, 14 pages.

*Primary Examiner* — Angelica Perez
(74) *Attorney, Agent, or Firm* — Mark H. Williams

(57) ABSTRACT

In a particular embodiment, an apparatus is disclosed that includes a battery pack structure that includes a plurality of battery cells. The apparatus also includes wireless battery management system that includes a first wireless communication device, a second wireless communication device, and a radio frequency passive repeater. The radio frequency passive repeater includes a conductor cable, a first antenna at a first end of the conductor cable, and a second antenna at the second end of the conductor cable. In this example embodiment, the first antenna is located within a first wireless signal reception zone of the first wireless communication device and the second antenna is located within a (Continued)

---

Receive From A Second Communication Device, By The Second Antenna Of The RF Passive Repeater, Data Associated With The Plurality Of Battery Cells In The Battery Pack Structure
1002

Transmit To The First Communication Device, By The First Antenna Of The RF Passive Repeater, The Received Data Associated With The Plurality Of Battery Cells In The Battery Pack Structure 1004 second wireless signal reception zone of the second wireless communication device.

10 Claims, 11 Drawing Sheets

(51) Int. Cl.
*H01Q 1/32* (2006.01)
*H04B 7/145* (2006.01)
*B60L 58/10* (2019.01)

(52) U.S. Cl.
CPC ...... *B60L 58/10* (2019.02); *H01M 2010/4271* (2013.01); *H01M 2010/4278* (2013.01)

(58) Field of Classification Search
CPC ........... H01M 2220/20; H01M 50/204; H01M 50/249; H01M 10/482; H01Q 1/3233; H01Q 1/22; Y02E 60/10; Y02T 10/70; Y02T 90/16; B60L 58/10; B60L 50/64
See application file for complete search history.

(56) References Cited

U.S. PATENT DOCUMENTS

| | | |
|---|---|---|
| 2015/0357685 A1 | 12/2015 | Iwasawa et al. |
| 2019/0252734 A1* | 8/2019 | Razzell ............... H01M 10/425 |
| 2019/0261100 A1* | 8/2019 | Troelsen ............... H04R 25/60 |
| 2020/0064408 A1 | 2/2020 | Sato |
| 2020/0142004 A1 | 5/2020 | Ito et al. |
| 2020/0235442 A1 | 7/2020 | Yamashita et al. |
| 2021/0076293 A1 | 3/2021 | Doherty et al. |

FOREIGN PATENT DOCUMENTS

| | | | |
|---|---|---|---|
| EP | 3890096 A1 | | 10/2021 |
| JP | 2016012954 A | | 1/2016 |
| JP | 2021028997 A | * | 10/2017 |
| WO | 2015083208 A1 | | 6/2015 |
| WO | 2020159300 A1 | | 8/2020 |

\* cited by examiner

Receive From A Second Communication Device, By The Second Antenna Of The RF Passive Repeater, Data Associated With The Plurality Of Battery Cells In The Battery Pack Structure 1002

Transmit To The First Communication Device, By The First Antenna Of The RF Passive Repeater, The Received Data Associated With The Plurality Of Battery Cells In The Battery Pack Structure 1004

FIG. 10

COMMUNICATION IN A WIRELESS BATTERY MANAGEMENT SYSTEM FOR A BATTERY PACK STRUCTURE

BACKGROUND ART

Electric vehicles are powered by high voltage battery systems having multiple cells. Battery management systems are used to monitor various attributes of the cells, including voltage, temperature, and current, in order to ensure proper and safe operation of the battery. In a conventional wired battery management system, multiple cells of the battery are grouped into modules, with each module having a component to monitor these attributes. Each of these components is wired to a central controller. Problems caused by this solution include lack of flexibility in pack design, wasted space due to connectors and cabling inside the battery pack, and increased challenges for battery second life usage. Though wireless technologies may be used to connect battery monitoring components to a central controller, these wireless technologies are vulnerable to interference from the structure of the battery pack.

SUMMARY OF INVENTION

Embodiments are disclosed for improved communication in a wireless battery management system for a battery pack structure. In a particular embodiment, an apparatus is disclosed that includes a battery pack structure having a plurality of battery cells. The apparatus also includes a wireless battery management system having a first wireless communication device, a second wireless communication device, and a radio frequency passive repeater. The radio frequency passive repeater includes a conductor cable, a first antenna at a first end of the conductor cable, and a second antenna at the second end of the conductor cable. In this example embodiment, the first antenna is located within a first wireless signal reception zone of the first wireless communication device and the second antenna is located within a second wireless signal reception zone of the second wireless communication device.

In another embodiment, a method of improving communication between communication devices in a wireless battery management system for a battery pack structure that includes a plurality of battery cells is disclosed. The wireless battery management system includes a first communication device, a second communication device, and a radio frequency (RF) passive repeater comprising: a conductor cable, a first antenna at a first end of the conductor cable, and a second antenna at the second end of the conductor cable. The method includes the second antenna of the RF passive repeater receiving from the second communication device, data associated with the plurality of battery cells in the battery pack structure. In this embodiment, the method also includes the first antenna of the RF passive repeater, transmitting to the first communication device, the received data associated with the plurality of battery cells in the battery pack structure.

As will be explained below, components of a battery pack apparatus may hinder or prevent effective communication between the wireless communication devices. Placing a RF passive repeater between the communication devices may improve communication in the wireless battery management system by facilitating transmission of data between the wireless communication devices.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF DRAWINGS

FIG. 10 is a flowchart that illustrates an implementation of a method of communication in a wireless battery management system for a battery pack structure, in accordance with the present disclosure.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
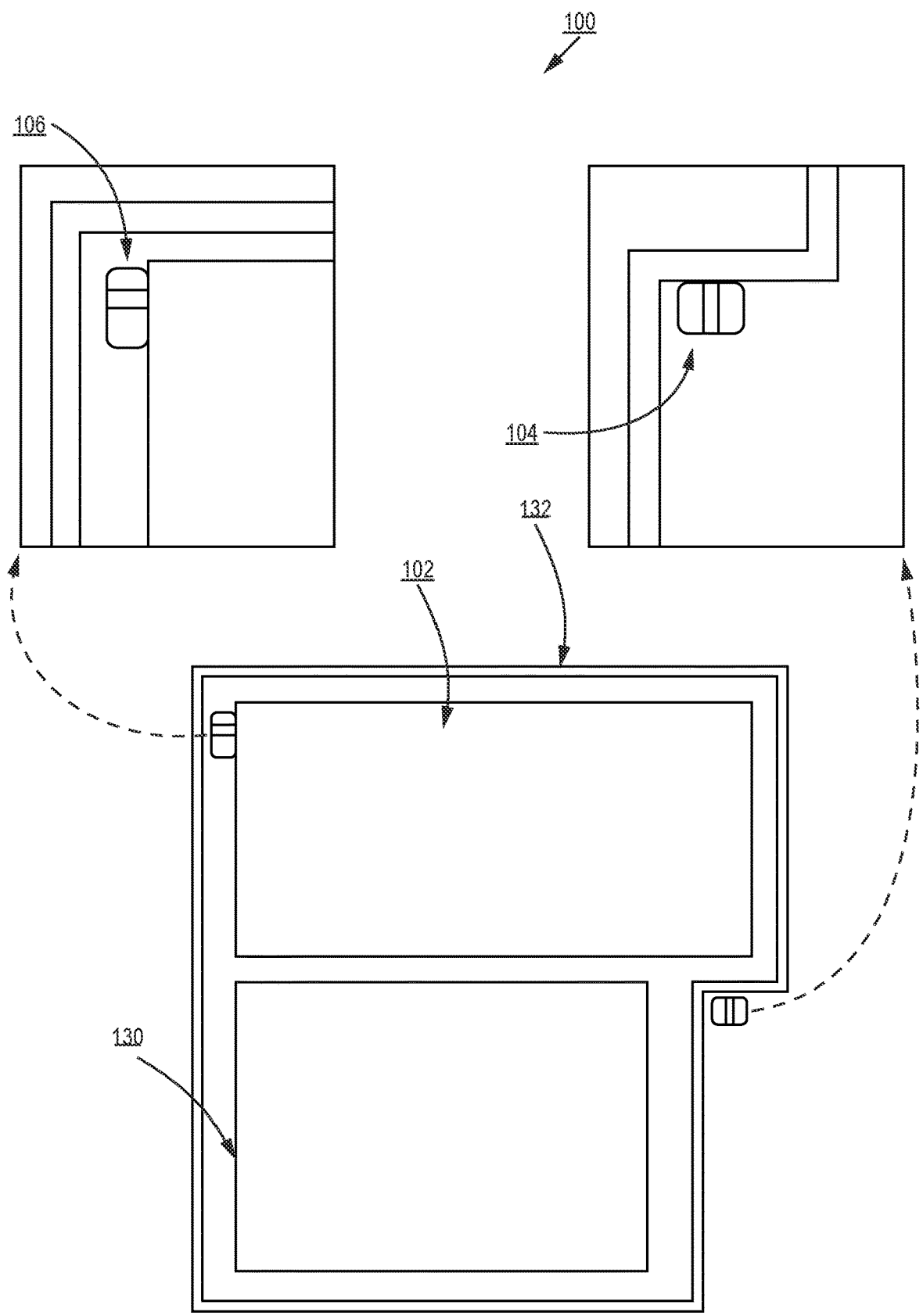
FIG. 1 sets forth a diagram of a battery pack apparatus that includes a wireless battery management system.

Exemplary methods, systems, and apparatuses for communication in a wireless battery management system in accordance with the present disclosure are described with reference to the accompanying drawings, beginning with FIG. 1. FIG. 1 sets forth a diagram of a battery pack apparatus (100) having an enclosure (132) that contains a battery pack structure (102) and another component (130).

Although not pictured, the battery pack structure (102) may be used to store a plurality of battery cells, such as Lithium-ion (Li-ion) cells. The cells may be grouped into modules such that each module comprises a corresponding subset of the cells. The cells may be physically grouped into modules using a casing, chassis, or other enclosure. The cells may also be logically grouped into modules by virtue of distinct groupings of cells being monitored by a distinct module monitoring system, as will be described below.

In the example of FIG. 1, the battery pack apparatus (100) includes a first communication device (104) and a second communication device (106). The first communication device (104) and the second communication device (106) may be configured to wirelessly communicate with each other. That is, the first communication device may include a wireless transceiver that is configured to transmit a wireless signal.

In a particular embodiment, the first communication device (104) and the second communication device (106) are part of a wireless battery management system. For example, the second communication device (106) may be a module monitoring system (MMS) that is configured to monitor a corresponding module of cells (not pictured) within the battery pack (102). For example, each cell module may have a MMS attached to a chassis, base, tray, or other mechanism holding the cells of the module. Each MMS includes sensors to measure various attributes of the cells of its corresponding module. Such attributes may include voltage, current, temperature, and potentially other attributes. The attributes are indicated in battery sensor data generated by the MMS. Each MMS may be configured to encode its battery sensor data for transmission as a wireless radio frequency signal and wirelessly transmit, via a wireless transceiver, its battery sensor data as the radio frequency signal to a central controller. In this example, the first communication device (104) may be a central controller that is configured to receive data from a plurality of MMSs, such as the second wireless device (106). The central controller may then provide the battery sensor data to a vehicle control system.

As will be explained further below, wireless communication between the first wireless communication device (104) and the second wireless communication device (106) may experience interference from the battery pack structure (102) or other components of the battery pack apparatus (100), which may create issues with the radio frequency (RF) link budget of the communication devices (104, 106).

Figure 2:
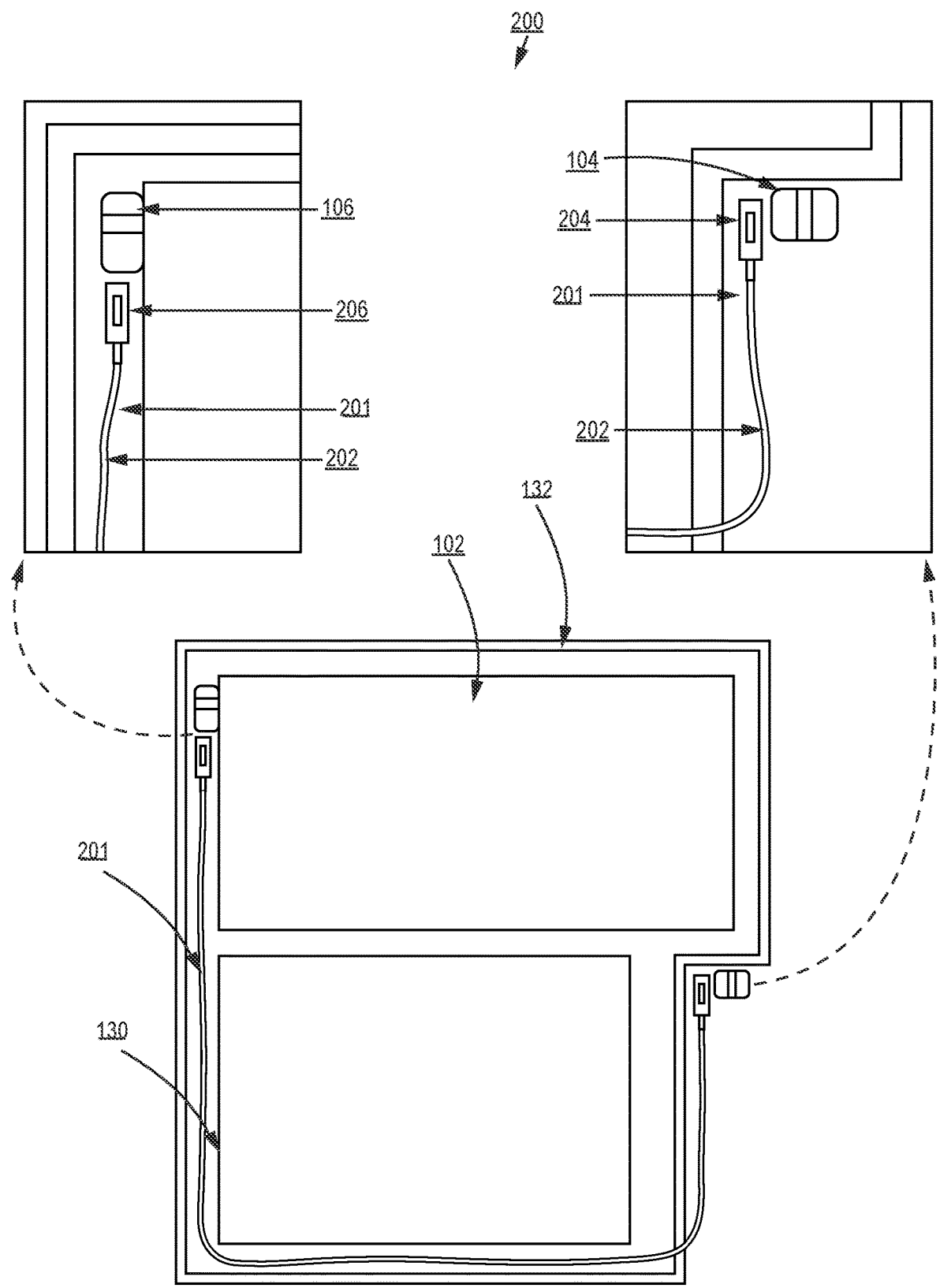
FIG. 2 sets forth a diagram of a battery pack apparatus that includes the battery pack apparatus of FIG. 1 with the addition of a RF passive repeater, in accordance with at least one embodiment of the present disclosure.

For further explanation, FIG. 2 sets forth a diagram of a battery pack apparatus (200) that includes the battery pack apparatus (100) of FIG. 1 with the addition of a RF passive repeater (201), in accordance with at least one embodiment of the present disclosure. The RF passive repeater (201) includes a conductor cable (202), a first antenna (204) at a first end of the conductor cable (202), and a second antenna (206) at the second end of the conductor cable (202). In the example of FIG. 2, the first antenna (204) is located within a first wireless signal reception zone of the first wireless communication device (104) and the second antenna (206) is located within a second wireless signal reception zone of the second wireless communication device (106).

A first wireless signal reception zone is an area surrounding the first communication device that a device may be located and transmit a wireless signal that is received by the first communication device. A second wireless signal reception zone is an area surrounding the second communication device that a receiver may be located and receive a wireless signal from the second communication device. By placing, respectively, the antennas of the RF passive repeater within the first wireless signal reception zone and the second wireless signal reception zone, the RF passive repeater may propagate the wireless signal from the second wireless signal reception zone to the first wireless signal reception zone. In a battery pack apparatus with components that hinder or prevent wireless transmission between the communication devices, adding a RF passive repeater may facilitate transmission of the wireless signal and thus improve communication between the first communication device and the second communication device.

In a particular embodiment, no electrical component is needed to create a purely electrical independent wave guide to help the RF link budget between the first communication device (104) and the second communication device (106) if the impedance of the first antenna (204) and the second antenna (206) matches the impedance of the conductor cable (202). Any kind of antenna may be used as long as the chosen antenna is passive and can be easily matched to characteristic impedance of the conductor cable.

Figure 3:
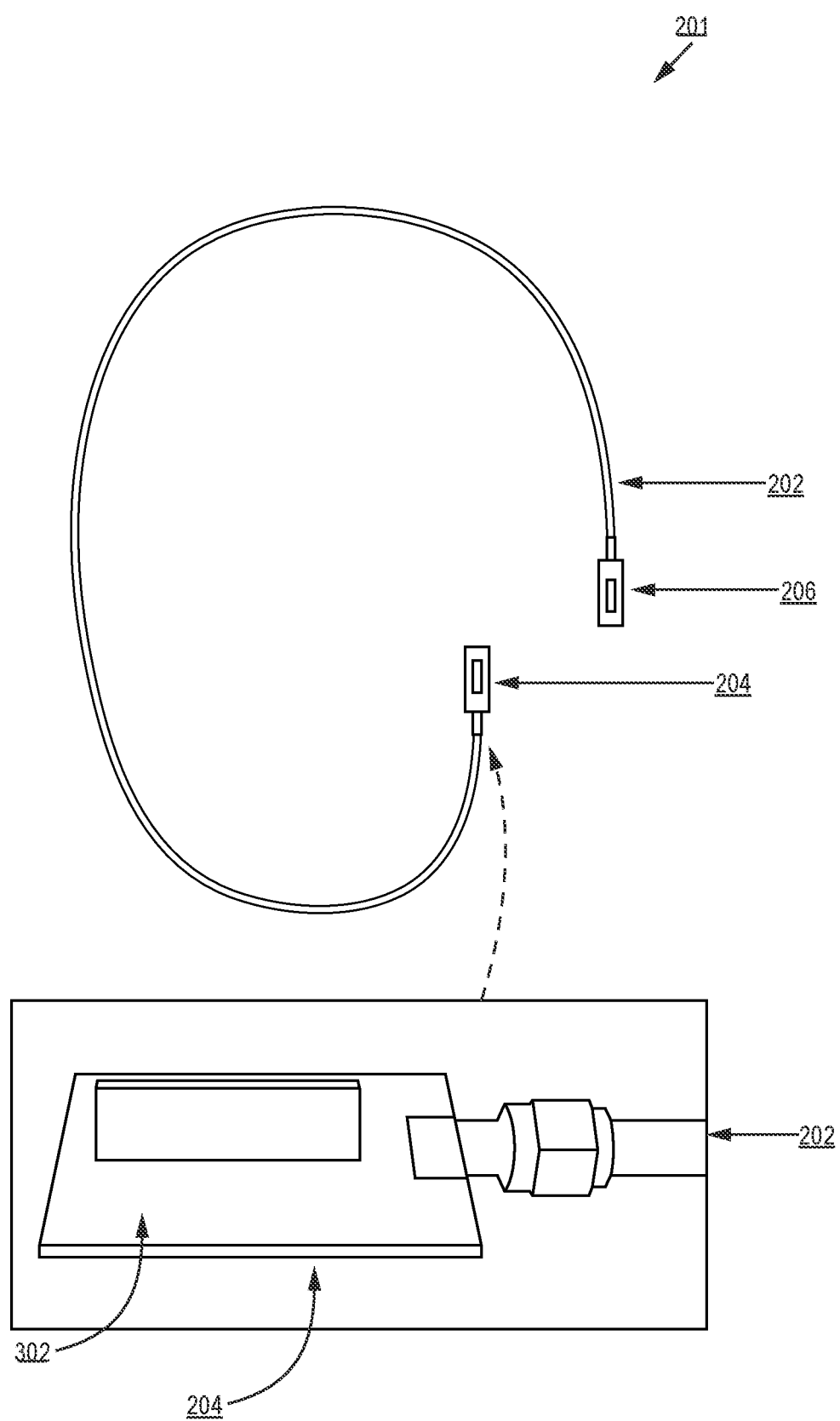
FIG. 3 sets forth a diagram of the RF passive repeater of FIG. 2, in accordance with at least one embodiment of the present disclosure.

For further explanation, FIG. 3 sets forth a diagram of the RF passive repeater of FIG. 2. In the example of FIG. 2 and FIG. 3, the conductor cable (202) of the RF passive repeater (201) is a coaxial cable and the first antenna (204) and the second antenna (206) may be formed using a substrate (302) coupled to the conductor cable. Readers of skill in the art will realize that the conductor cable may be formed using a variety of materials that are capable of conducting a RF transmission. For example, the conductor cable may be a micro-strip or a co-planar waveguide.

Figure 4:
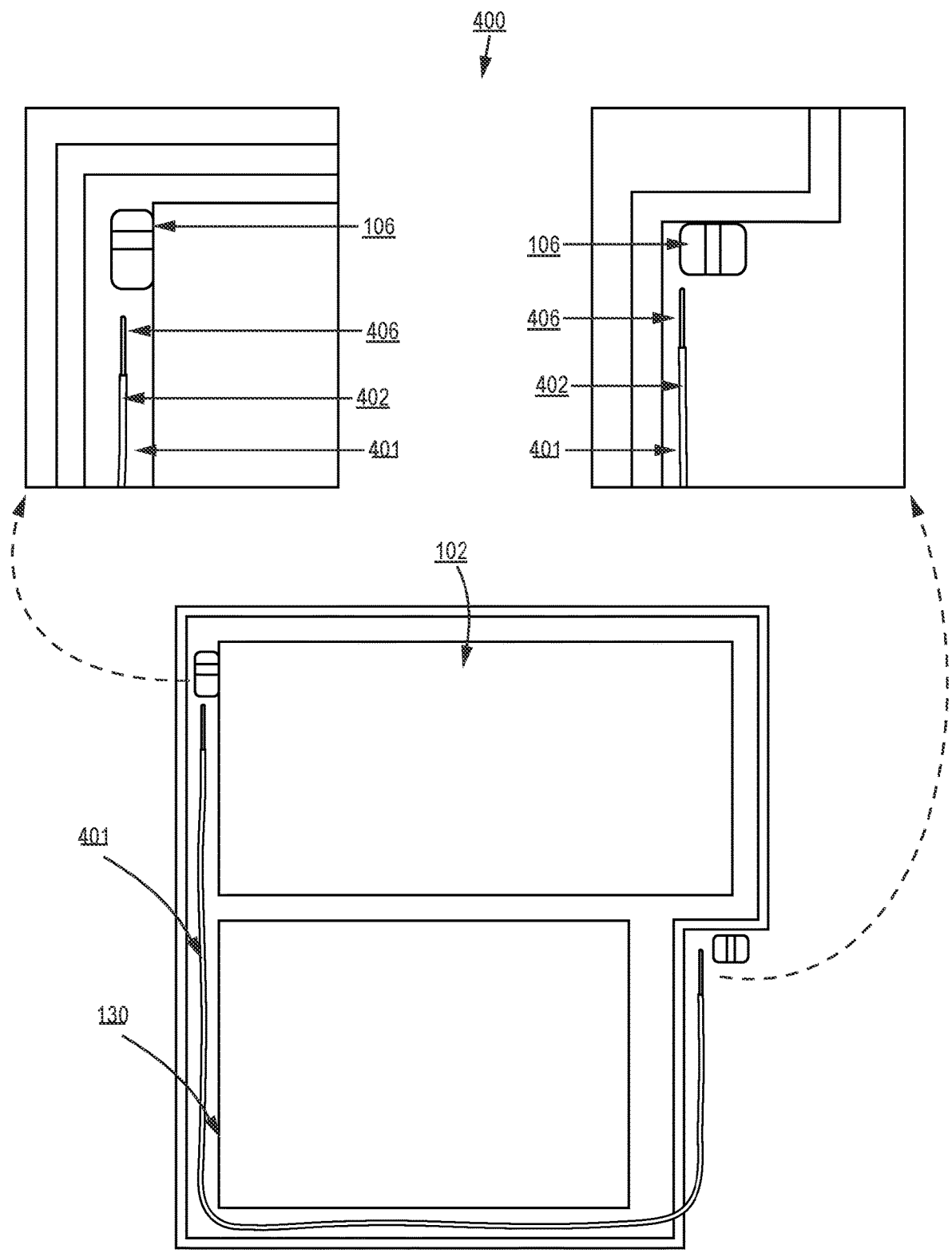
FIG. 4 sets forth a diagram of a battery pack apparatus that includes the battery pack apparatus of FIG. 1 with the addition of a RF passive repeater, in accordance with at least one embodiment of the present disclosure.

For further explanation, FIG. 4 sets forth a diagram of an apparatus (400) that includes the battery pack apparatus (100) of FIG. 1 with the addition of a RF passive repeater (401). The RF passive repeater (401) of FIG. 4 includes a conductor cable (402), a first antenna (404) at a first end of the conductor cable (402), and a second antenna (406) at the second end of the conductor cable (402). In the example of FIG. 4, the first antenna (404) is located within a first wireless signal reception zone of the first wireless communication device (104) and the second antenna (406) is located within a second wireless signal reception zone the second wireless communication device (106).

A first wireless signal reception zone is an area surrounding the first communication device that a device may be located and transmit a wireless signal that is received by the first communication device. A second wireless signal reception zone is an area surrounding the second communication device that a receiver may be located and receive a wireless signal from the second communication device. By placing, respectively, the antennas of the RF passive repeater within the first wireless signal reception zone and the second wireless signal reception zone, the RF passive repeater may propagate the wireless signal from the second wireless signal reception zone to the first wireless signal reception zone. In a battery pack apparatus with components that hinder or prevent wireless transmission between the communication devices, adding a RF passive repeater may facilitate transmission of the wireless signal and thus improve communication between the first communication device and the second communication device.

In a particular embodiment, no electrical component is needed to create a purely electrical independent wave guide to help the RF link budget between the first communication device (104) and the second communication device (106) if the impedance of the first antenna (204) and the second antenna (206) matches the impedance of the conductor cable (202). Any kind of antenna may be used as long as the chosen antenna is passive and can be easily matched to characteristic impedance of the conductor cable.

Figure 5:
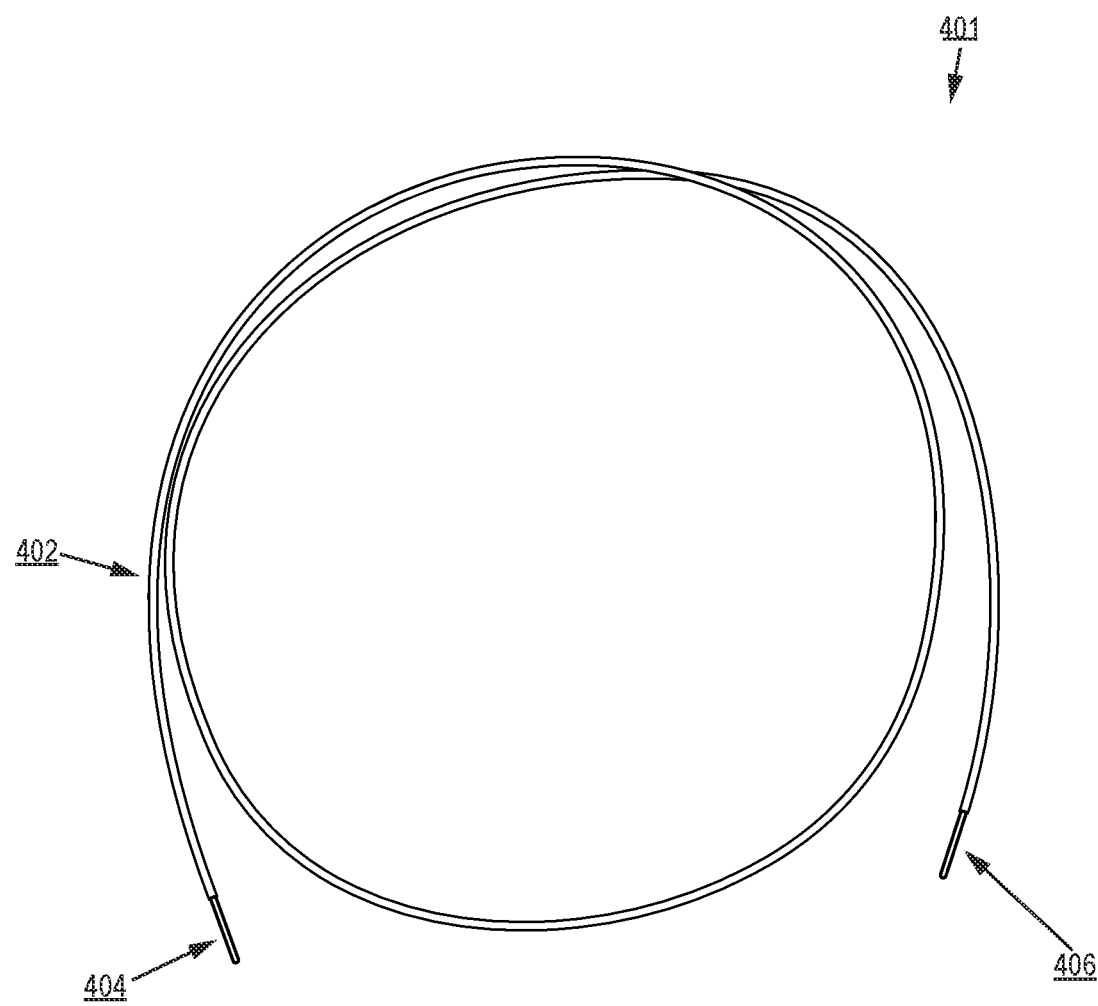
FIG. 5 sets forth a diagram of the RF passive repeater of FIG. 4, in accordance with at least one embodiment of the present disclosure.
Figure 5:
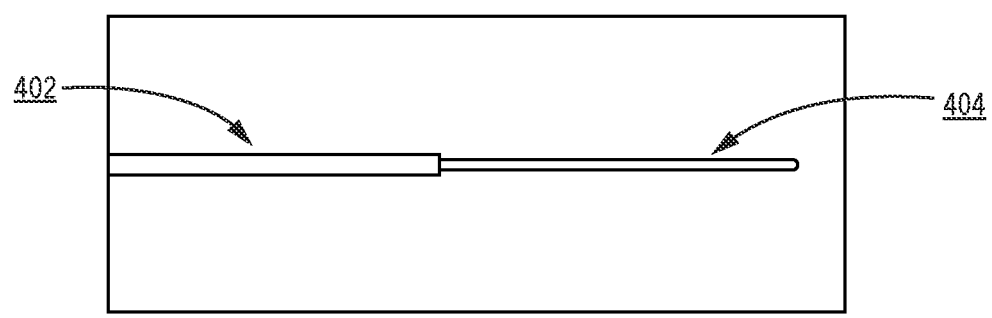

For further explanation, FIG. 5 sets forth a diagram of the RF passive repeater (401) of FIG. 4. In the example of FIG. 4 and FIG. 5, the conductor cable (402) of the RF passive repeater (401) is a coaxial cable and the first antenna (404) and the second antenna (406) may be formed by stripping back the first end of the conductor cable (402) and the second antenna is formed by stripping back the second end of the conductor cable (402). In a particular embodiment, the ends of the conductor cable (402) are stripped back by a quarter of a wavelength, leaving enough of the inner conductor exposed so as to radiate at the frequency of interest.

Figure 6:
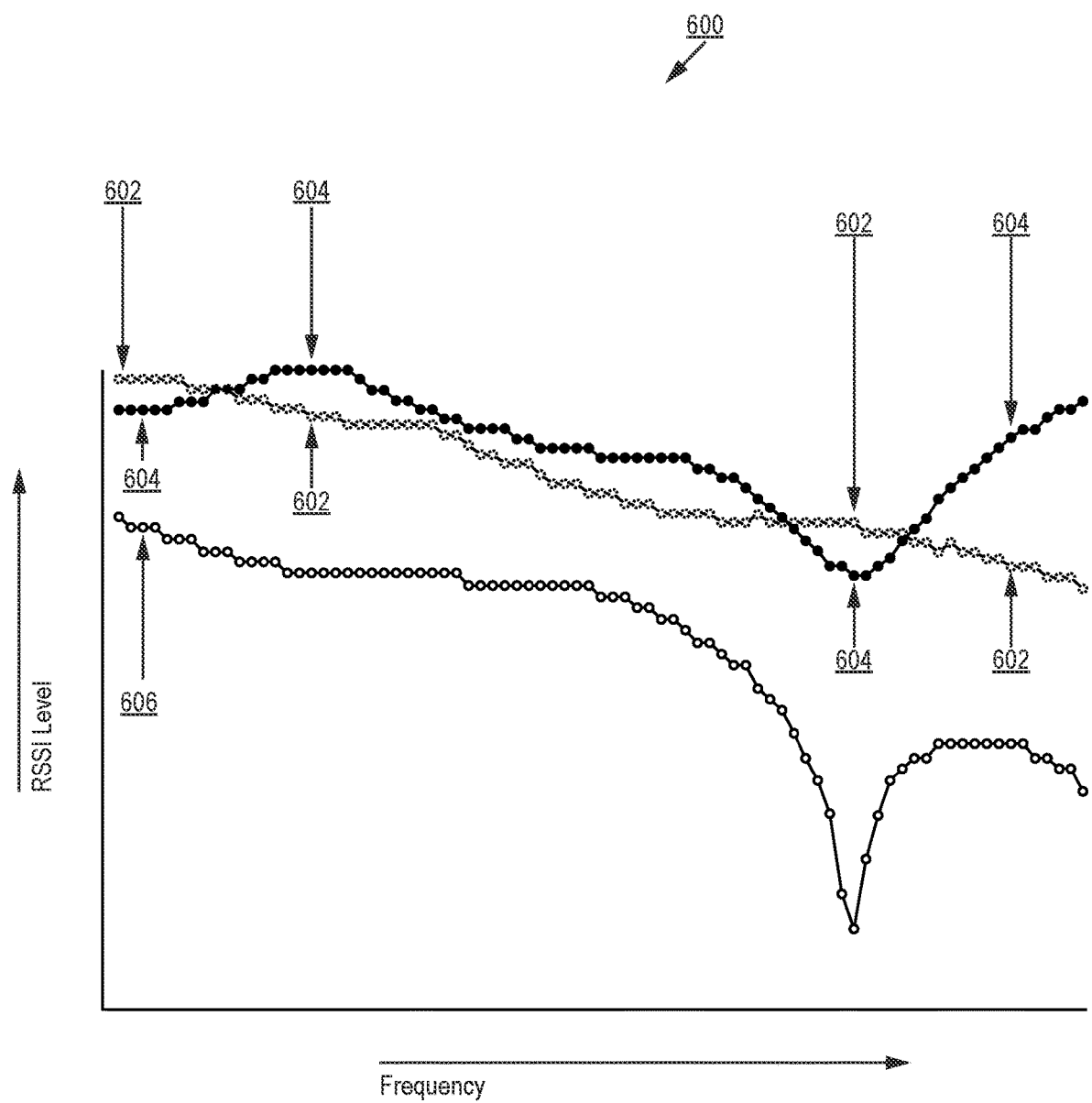
FIG. 6 sets forth a diagram of a graph indicating the signal strength received at a first wireless communication device from a second wireless communication device in the various battery management system configurations of FIGS. 1, 2, and 4.

For further explanation, FIG. 6 sets forth a diagram of a graph (600) indicating the signal strength received at the first wireless communication device (104) from the second wireless communication device (106) in the various battery management system configurations of FIGS. 1, 2, and 4. The horizontal bar on the graph (600) indicates the transmission received signal strength indication (RSSI) and the vertical bar indicates the RSSI level (dB). In the example of FIG. 6, the graph (600) corresponds to a test in the 2.4 GHz band (80 channels from 2.4 GHz to 2.48 GHz). RSSI represents the reliability of the RF link between the first communication device (104) and the second communication device (106).

Data points (606) indicate the signal strength received at the first wireless communication device (104) from the second wireless communication device (106) in the battery pack apparatus (100) of FIG. 1. Data points (602) indicate the signal strength received at the first wireless communication device (104) from the second wireless communication device (106) in the apparatus (200) of FIG. 2. Data points (604) indicate the signal strength received at the first wireless communication device (104) from the second wireless communication device (106) in the apparatus (400) of FIG. 4. The graph (600) illustrates that with the inclusion of a RF passive repeater (201, 401), into a battery pack apparatus (as in battery pack apparatus (200) of FIG. 2 and the battery pack apparatus (400) of FIG. 4), an improvement of 10 dB is possible in the total band over the battery pack apparatus (100) of FIG. 1 that does not include an RF passive repeater.

Figure 7A:
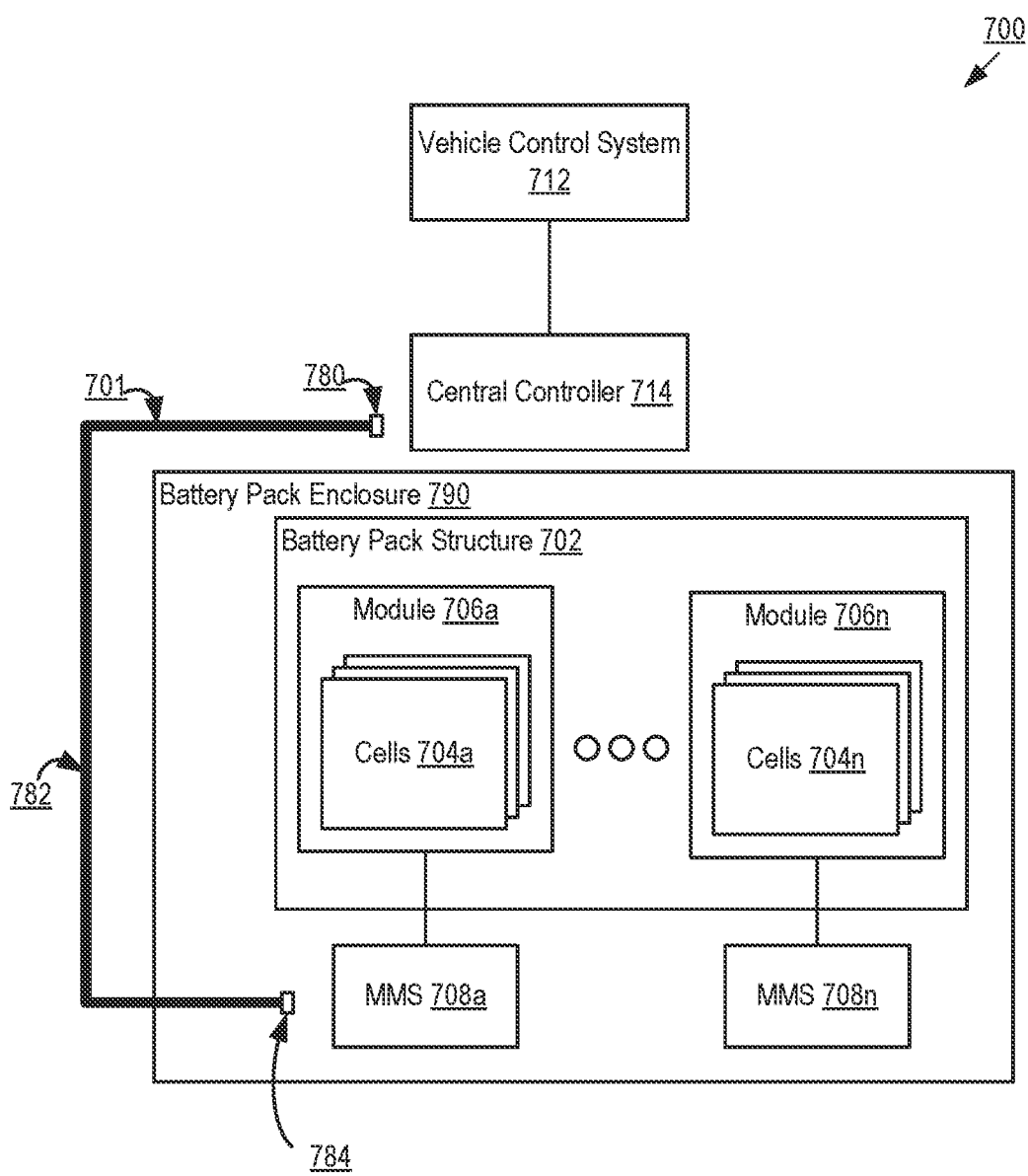
FIG. 7A sets forth a block diagram of an apparatus that includes a wireless battery management system, in accordance with at least one embodiment of the present disclosure.

FIG. 7A sets forth a block diagram of an apparatus (700) that includes a wireless battery management system, in accordance with at least one embodiment of the present disclosure. The apparatus includes a battery pack enclosure (790) having a battery pack structure (702), such as a high voltage battery for use in an electric vehicle. The battery pack structure (702) includes a plurality of cells (704a-n), such as Lithium-ion (Li-ion) cells. The cells (704a-n) are grouped into modules (706a-n) such that each module (706a-n) comprises a corresponding subset of the cells (704a-n). The cells (704a-n) may be physically grouped into modules (706a-n) using a casing, chassis, or other enclosure. The cells (704a-n) may also be logically grouped into modules (706a-n) by virtue of distinct groupings of cells (704a-n) being monitored by a distinct module monitoring system (708a-n), as will be described below.

The apparatus (700) also includes a plurality of module monitoring systems (MMS) (708a-n). Each MMS (708a-n) is configured to monitor a corresponding module (706a-n) of cells (704a-n). For example, each module (706a-n) may have a MMS (708a-n) attached to a chassis, base, tray, or other mechanism holding the cells (704a-n) of the module (706a-n). Each MMS (708a-n) includes sensors to measure various attributes of the cells (704a-n) of its corresponding module (706a-n). Such attributes may include voltage, current, temperature, and potentially other attributes. The attributes are indicated in battery sensor data generated by the MMS (708a-n).

Each MMS (708a-n) encodes its battery sensor data for transmission as a wireless signal and transmits its battery sensor data as the wireless signal to a central controller (114). For example, each MMS (108a-n) includes a wireless transmitter. A wireless receiver of the central controller (114) may then receive the wireless signal and convert the wireless signal into data. The central controller (114) may then provide the battery sensor data to a vehicle control system (112).

As explained above, components within the battery pack enclosure (790) may hinder or prevent communication of the wireless signal from the MMSs to the central controller. To aid in the transmission of the wireless signal, the apparatus (700) of FIG. 7A includes a radio frequency (RF) passive repeater (701) having a conductor cable (782) with a first antenna (784) and a second antenna (780). In the example of FIG. 7A, the first antenna (784) is located within a first wireless signal reception zone of the MMSs and the second antenna (780) is located within located within a second wireless signal reception zone of the central controller (714). During operation, the first antenna of the RF passive repeater receives the wireless signal from one or more of the MMSs, propagates the signal over the conductor cable (782), and transmits the wireless signal from the second antenna (780) to the central controller (714). That is, the RF passive repeater may enable transmission of the wireless signal between the MMSs and the central controller.

A first wireless signal reception zone is an area surrounding one or more MMSs that a receiver may be located and receive a wireless signal from the MMSs. A second wireless signal reception zone is an area surrounding the central controller that a device may be located and transmit a wireless signal that is received by the central controller. By placing, respectively, the antennas of the RF passive repeater within the first wireless signal reception zone and the second wireless signal reception zone, the RF passive repeater may propagate the wireless signal from the first wireless signal reception zone of the one or more MMSs to the second wireless signal reception zone of the central controller. In a battery pack apparatus with components that hinder or prevent wireless transmission between the MMSs and the central controller, adding a RF passive repeater may facilitate transmission of the wireless signal and thus improve communication between the MMSs and the central controller.

Figure 7B:
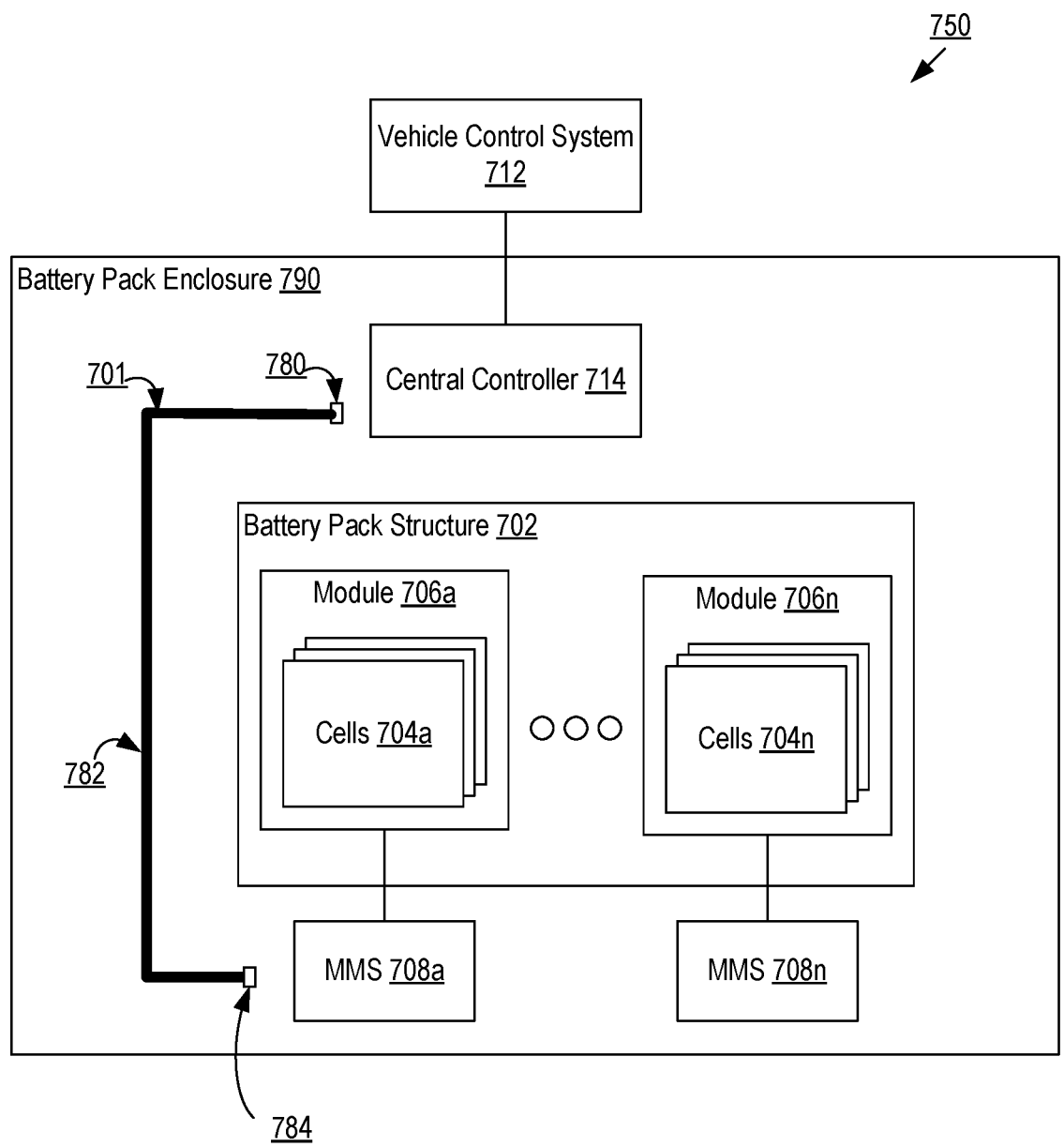
FIG. 7B sets forth a block diagram of an apparatus that includes a wireless battery management system, in accordance with at least one embodiment of the present disclosure.

FIG. 7B sets forth a block diagram of an apparatus (750) that includes a wireless battery management system, in accordance with at least one embodiment of the present disclosure. In the example of FIG. 7B, the apparatus (750) includes the components of FIG. 7A with the central controller (714) and the second antenna (780) within the battery pack enclosure (790). Readers of skill in the art will realize that FIG. 7A and FIG. 7B are merely example configurations and that additional enclosures, components, and structures may be incorporated into a battery pack apparatus and the RF passive repeater (701) may be positioned to rely signals between one or more MMS (708*a-n*) and the central controller (714).

Figure 8:
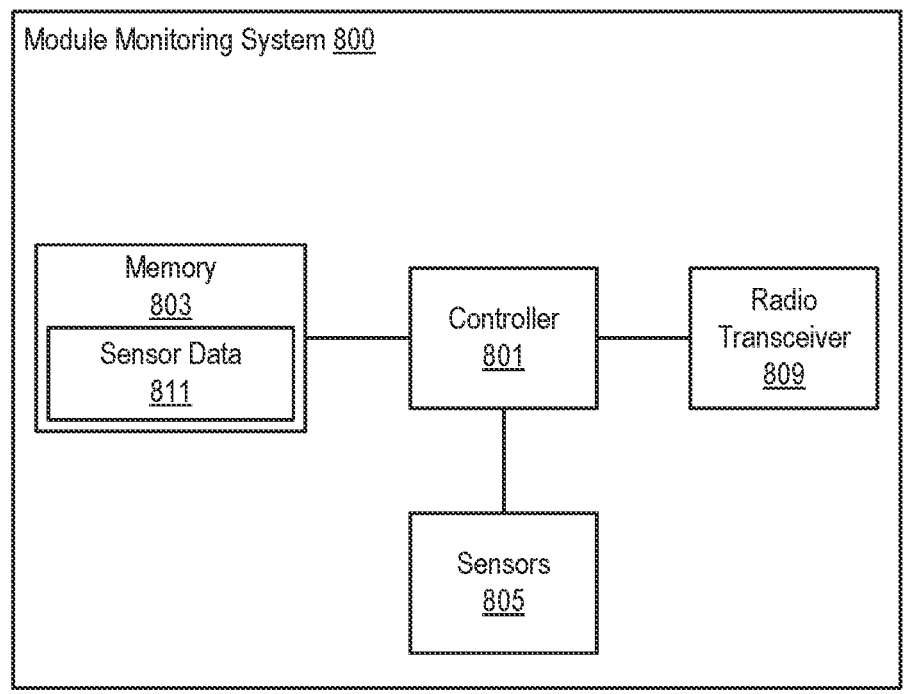
FIG. 8 illustrates a block diagram of the module monitoring system of FIG. 7A and FIG. 7B, in accordance with at least one embodiment of the present disclosure.

For further explanation, FIG. 8 sets forth a block diagram of a module monitoring system (MMS) (800) (e.g., a module monitoring system (708*a-n*) of FIGS. 7A and 7B) for communication in a battery pack apparatus according to embodiments of the present disclosure. The MMS (800) includes a controller (801) coupled to a memory (803). The controller (801) is configured to obtain sensor readings from sensors (805) (e.g., voltage sensors, temperature sensors, current sensors) to generate battery sensor data (811). The controller (801) is also configured to transmit the sensor data (811) via a radio frequency transceiver (809). The controller (801) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (811) may be stored in the memory (803). The memory (803) may be a non-volatile memory such as flash memory.

Figure 9:
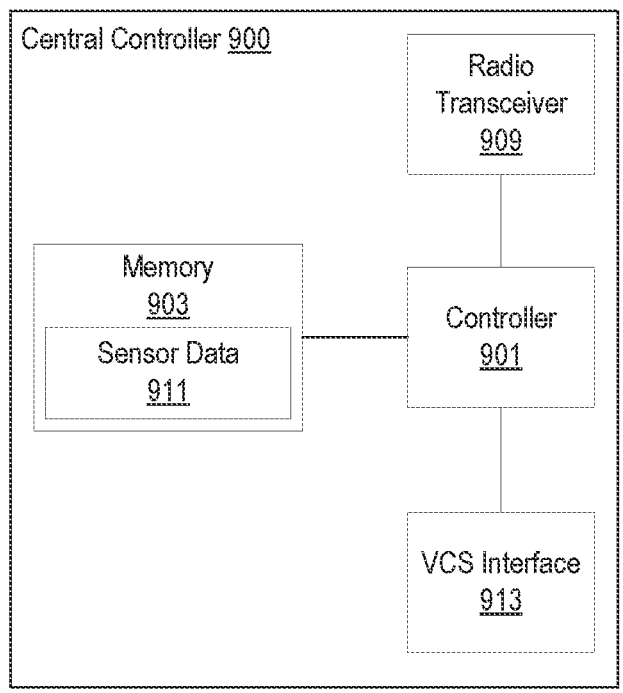
FIG. 9 illustrates a diagram of the wireless controller of FIG. 7A and FIG. 7B, in accordance with at least one embodiment of the present disclosure.

For further explanation, FIG. 9 sets forth a block diagram of a central controller (900) (e.g., a central controller (714) of FIGS. 7A and 7B) according to embodiments of the present disclosure. The central controller (900) includes a controller (901) coupled to a memory (903). The controller (901) is configured to receive, via a radio transceiver (909) from a plurality of MMSs (e.g., MMS (800) of FIG. 8), wireless signals encoding sensor data (911). The controller (901) may then generate sensor data (911) based on the wireless signal.

The controller (901) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (911) may be stored in the memory (903). The memory (903) may be a non-volatile memory such as flash memory. The controller (901) is further configured to provide sensor data to a vehicle control system (e.g., a VCS (712) of FIG. 7A) via a VCS interface (913). The VCS interface (913) may include a bus or other wired connection to a VCS.

For further explanation, FIG. 10 sets forth a flowchart that illustrates an implementation of a method of communication in a wireless battery management system for a battery pack structure, in accordance with the present disclosure. The method of FIG. 10 includes receiving (1002) from the second communication device, by the second antenna of the RF passive repeater, data associated with the plurality of battery cells in the battery pack structure. Receiving (1002) from the second communication device, by the second antenna of the RF passive repeater, data associated with the plurality of battery cells in the battery pack structure may be carried out by the second antenna (e.g., the second antenna (206) of FIG. 2) passively receiving a wireless signal from a wireless transceiver of the second communication device (e.g., the second communication device (106) of FIG. 2).

The method of FIG. 10 also includes transmitting (1004) to the first communication device, by the first antenna of the RF passive repeater, the received data associated with the plurality of battery cells in the battery pack structure. Transmitting (1004) to the first communication device, by the first antenna of the RF passive repeater, the received data associated with the plurality of battery cells in the battery pack structure may be carried out by the first antenna (e.g., the first antenna (204) of FIG. 2) passively broadcasting the wireless signal to the wireless transceiver of the first communication device (e.g., the first communication device (104) of FIG. 1).

Advantages and features of the present disclosure can be further described by the following statements:

1. An apparatus that includes a battery pack structure that includes a plurality of battery cells; and a wireless battery management system that includes: a first wireless communication device; a second wireless communication device; and a radio frequency (RF) passive repeater that includes: a conductor cable; a first antenna at a first end of the conductor cable; and a second antenna at the second end of the conductor cable; wherein the first antenna is located within a first wireless signal reception zone of the first wireless communication device and the second antenna is located within a second wireless signal reception zone of the second wireless communication device.

2. The apparatus of statement 1, wherein the battery cells are grouped into one or more modules.

3. The apparatus of statement 1 or 2, wherein the second communication device is a module monitoring system (MMS) configured to monitor attributes of the battery cells in the one or more modules and transmit the monitored attributes to the first communication device.

4. The apparatus of any of statements 1-3, wherein the first communication device is a central controller that is configured to receive the monitored attributes from the MIMS.

5. The apparatus of any of statements 1-4, wherein the conductor cable includes a coaxial cable.

6. The apparatus of any of statements 1-5, wherein the first antenna is formed by stripping back the first end of the conductor cable; and the second antenna is formed by stripping back the second end of the conductor cable.

7. The apparatus of any of statements 1-6, wherein at least one of the first antenna and the second antenna includes a substrate that is coupled to the conductor cable.

8. The apparatus of any of statements 1-7, wherein the conductor cable includes a micro-strip.

9. The apparatus of any of statements 1-8, wherein the conductor cable includes a co-planar waveguide.

10. The apparatus of any of statements 1-9, wherein the impedance of the first antenna and the second antenna matches the impedance of the conductor cable.

11. A method of communication in a wireless battery management system for a battery pack structure that includes a plurality of battery cells, the wireless battery management system including a first communication device, a second communication device, and a radio frequency (RF) passive repeater comprising: a conductor cable, a first antenna at a first end of the conductor cable, and a second antenna at the second end of the conductor cable; the method comprising: receiving from the second communication device, by the second antenna of the RF passive repeater, data associated with the plurality of battery cells in the battery pack structure; and transmitting to the first communication device, by the first antenna of the RF passive repeater, the received data associated with the plurality of battery cells in the battery pack structure.

12. The method of statement 11, wherein the battery cells are grouped into one or more modules.

13. The method of statements 11 or 12, wherein the second communication device is a module monitoring system (MMS) configured to monitor attributes of the battery cells in the one or more modules and transmit the monitored attributes to the first communication device.

14. The method of any of statements 11-13, wherein the first communication device is a central controller that is configured to receive the monitored attributes from the MIMS.

15. The method of any of statements 11-14, wherein at least one of the first antenna and the second antenna include a substrate that is coupled to the conductor cable.

16. The method of any of statements 11-15, wherein the conductor cable includes a coaxial cable.

17. The method of any of statements 11-16, wherein the first antenna is formed by stripping back the first end of the conductor cable; and the second antenna is formed by stripping back the second end of the conductor cable.

18. The method of any of statements 11-17, wherein the conductor cable includes a micro-strip.

19. The method of any of statements 11-18, wherein the conductor cable includes a co-planar waveguide.

20. The method of any of statements 11-19, wherein the impedance of the first antenna and the second antenna matches the impedance of the conductor cable.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. An apparatus comprising:
   a battery pack structure that includes a plurality of battery cells grouped into one or more modules; and
   a wireless battery management system that includes:
   a first wireless communication device;
   a second wireless communication device; wherein the second communication device is a module monitoring system, MMS, configured to monitor attributes of the battery cells in the one or more modules and transmit the monitored attributes to the first communication device; wherein the first communication device is a central controller that is configured to receive the monitored attributes from the MMS; and
   a radio frequency (RF) passive repeater that includes:
   a conductor cable; wherein the conductor cable includes a micro-strip;
   a first antenna at a first end of the conductor cable; and
   a second antenna at the second end of the conductor cable;
   wherein the first antenna is located within a first wireless signal reception zone of the first wireless communication device and the second antenna is located within a second wireless signal reception zone of the second wireless communication device.

2. The apparatus of claim 1, wherein the conductor cable includes a coaxial cable.

3. The apparatus of claim 2, wherein the first antenna is formed by stripping back the first end of the conductor cable; and the second antenna is formed by stripping back the second end of the conductor cable.

4. The apparatus of claim 1, wherein at least one of the first antenna and the second antenna includes a substrate that is coupled to the conductor cable.

5. The apparatus of claim 1, wherein the impedance of the first antenna and the second antenna matches the impedance of the conductor cable.

6. A method of communication in a wireless battery management system for a battery pack structure that includes a plurality of battery cells grouped into one or more modules, the wireless battery management system including a first communication device, a second communication device, wherein the second communication device is a module monitoring system, MMS, configured to monitor attributes of the battery cells in the one or more modules and transmit the monitored attributes to the first communication device; wherein the first communication device is a central controller that is configured to receive the monitored attributes from the MMS; and
   a radio frequency (RF) passive repeater comprising: a conductor cable, a first antenna at a first end of the conductor cable, and a second antenna at the second end of the conductor cable; wherein the conductor cable includes a co-planar waveguide;

the method comprising:

receiving from the second communication device, by the second antenna of the RF passive repeater, data associated with the plurality of battery cells in the battery pack structure; and transmitting to the first communication device, by the first antenna of the RF passive repeater, the received data associated with the plurality of battery cells in the battery pack structure.

7. The method of claim 6, wherein at least one of the first antenna and the second antenna include a substrate that is coupled to the conductor cable.

8. The method of claim 6, wherein the conductor cable includes a coaxial cable.

9. The method of claim 8, wherein the first antenna is formed by stripping back the first end of the conductor cable; and the second antenna is formed by stripping back the second end of the conductor cable.

10. The method of claim 6, wherein the impedance of the first antenna and the second antenna matches the impedance of the conductor cable.

\* \* \* \* \*